US008621080B2

(12) United States Patent
Iyoob et al.

(10) Patent No.: US 8,621,080 B2
(45) Date of Patent: Dec. 31, 2013

(54) ACCURATELY PREDICTING CAPACITY REQUIREMENTS FOR INFORMATION TECHNOLOGY RESOURCES IN PHYSICAL, VIRTUAL AND HYBRID CLOUD ENVIRONMENTS

(75) Inventors: Ilyas Iyoob, Austin, TX (US); Zehra Yalcin, Austin, TX (US); Manish Modh, Cedar Park, TX (US); Mohammed Farooq, Austin, TX (US)

(73) Assignee: Gravitant, Inc., Austin, TX (US)

( * ) Notice: Subject to any disclaimer, the term of this patent is extended or adjusted under 35 U.S.C. 154(b) by 170 days.

(21) Appl. No.: 13/042,138

(22) Filed: Mar. 7, 2011

(65) Prior Publication Data

US 2012/0233328 A1    Sep. 13, 2012

(51) Int. Cl.
*G06F 15/173* (2006.01)

(52) U.S. Cl.
USPC .......................................................... 709/226

(58) Field of Classification Search
USPC .......................................................... 709/226
See application file for complete search history.

(56) References Cited

U.S. PATENT DOCUMENTS

| | | | |
|---|---|---|---|
| 6,738,736 B1 | 5/2004 | Bond | |
| 6,738,933 B2 * | 5/2004 | Fraenkel et al. | 714/47.2 |
| 7,181,519 B2 | 2/2007 | Pillai et al. | |
| 7,571,082 B2 | 8/2009 | Gilpin et al. | |
| 7,707,015 B2 | 4/2010 | Lubrecht et al. | |
| 7,870,188 B2 | 1/2011 | Mazzitelli et al. | |
| 2004/0034662 A1 * | 2/2004 | Austin et al. | 707/104.1 |
| 2006/0101224 A1 * | 5/2006 | Shah et al. | 711/173 |
| 2008/0228459 A1 | 9/2008 | Jiang et al. | |
| 2008/0228644 A1 * | 9/2008 | Birkestrand et al. | 705/40 |

OTHER PUBLICATIONS

CA Forecasting (2007).*
"Predicting Multiple Metrics for Queries: Better Decisions Enabled by Machine Learning" (Ganapathi, Archana, at least by Jun. 30, 2008).*
"Supervised Learning" (wikipedia.org, Feb. 7, 2010).*
"Empirical Analysis of Application-Level Traffic Classification Using Supervised Machine Learning" (Park, Byungchul et al., Dept. of Computer Science and Engineering, POSTECH at least by Aug. 30, 2008).*

* cited by examiner

*Primary Examiner* — Benjamin R Bruckart
*Assistant Examiner* — Nicholas Celani
(74) *Attorney, Agent, or Firm* — Winstead, P.C.

(57) ABSTRACT

A method, system and computer program product for accurately predicting capacity requirements for Information Technology (IT) resources in physical, virtual, cloud and hybrid cloud environments. The business demand is translated into IT application demand, which is translated into IT architecture layer demand. Resource groups are created for each IT application, IT architecture layer and resource type combination. The utilization for each IT resource group within the IT architecture layers is computed using the created resource groups, IT application demand and IT architecture layer demand. Under or over-utilized IT resource groups may be identified using the computed utilization for each IT resource group. Upon identifying such IT resources, an optimal resource profile (e.g., number of servers) for each resource group is computed. In this manner, the utilization of IT resources can be more accurately predicted thereby allowing the IT resources to be used more effectively without over-utilizing or underutilizing these resources.

33 Claims, 10 Drawing Sheets

ACCURATELY PREDICTING CAPACITY REQUIREMENTS FOR INFORMATION TECHNOLOGY RESOURCES IN PHYSICAL, VIRTUAL AND HYBRID CLOUD ENVIRONMENTS

TECHNICAL FIELD

The present invention relates to capacity planning for networked computer systems, and more particularly to accurately predicting capacity requirements for information technology resources in various environments (e.g., physical, virtual, cloud, hybrid cloud).

BACKGROUND

Networked computer systems play important roles in the operation of many businesses and organizations. The performance of a computer system providing services to a business and/or customers of a business may be integral to the successful operation of the business. A computer system refers generally to any collection of one or more devices interconnected to perform a desired function, provide one or more services, and/or to carry out various operations of an organization, such as a business corporation, etc.

In some computer systems, the operation and maintenance of the system is delegated to one or more administrators (or operators) that make up the system's Information Technology (IT) organization. When a computer system is managed by an IT organization, the computer system may be referred to as an IT environment. The IT organization may set-up a computer system to provide end users with various application or transactional services, access to data, network access, etc., and establish the environment, security and permissions landscape and other capabilities of the computer system. This model allows dedicated personnel to customize the system, centralize application installation, establish access permissions, and generally handle the operation of the enterprise in a way that is largely transparent to the end user. The day-to-day maintenance and servicing of the system as well as the contributing personnel are referred to as IT operations.

As IT and application infrastructures become more complex, predicting and controlling system performance and capacity planning have become a difficult task to many organizations. Capacity planning, as used herein, refers to determining the amount of IT resources needed by an organization to meet changing demands. IT resources may include any resource, virtual or physical, that is used to process or service requests issued by users commonly referred to as "clients".

Traditional capacity planning techniques are often inadequate for accurately predicting resource needs. Often, the amount of IT resources that are expected to be needed by an organization are determined by trial and error. As a result, in many cases, the workload actually encountered by a deployed system does not correspond with a synthetic workload that was expected for the system. Further, workloads often include composite transactions (i.e., a single transaction comprising a plurality of transactions), and determining a resource cost for such composite transactions is challenging for system designers. As a result, IT resources are either underutilized or over-utilized and the excess capacity is stored for emergency situations.

If, however, the capacity requirements for IT resources could be accurately predicted, then the IT resources could be used more effectively without over-utilizing or underutilizing these resources.

BRIEF SUMMARY

In one embodiment of the present invention, a method for accurately predicting capacity requirements for information technology resources comprises translating business demand into information technology application demand. The method further comprises translating the information technology application demand into information technology architecture layer demand. Additionally, the method comprises creating resource groups for each information technology application, information technology architecture layer and resource type combination, where the resource type is a type of information technology resource used to process the information technology application demand. In addition, the method comprises computing, by a processor, utilization for each information technology resource group within information technology architecture layers using the created resource groups, the information technology application demand and the information technology architecture layer demand.

Other forms of the embodiment of the method described above are in a system and in a computer program product.

In another embodiment of the present invention, a method for accurately predicting capacity requirements for information technology resources comprises forecasting business demand by defining a set of planned or unplanned events and determining their impact on demand. The method further comprises determining the relationship between the business demand and information technology demand. Additionally, the method comprises translating the business demand to the information technology demand at information technology architecture layers. In addition, the method comprises computing, by a processor, estimated utilization of each of the information technology architecture layers based on the information technology demand and based on an estimate of capacity at the information technology architecture layers. Furthermore, the method comprises identifying any capacity gaps in the information technology resources. The method further comprises simulating the capacity gaps. In addition, the method comprises generating resolution options to the capacity gaps. Additionally, the method comprises optimizing, by a processor, the resolution options.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

In the following description, numerous specific details are set forth to provide a thorough understanding of the present invention. However, it will be apparent to those skilled in the art that the present invention may be practiced without such specific details. For the most part, details considering timing considerations and the like have been omitted inasmuch as such details are not necessary to obtain a complete understanding of the present invention and are within the skills of persons of ordinary skill in the relevant art.

Figure 1:
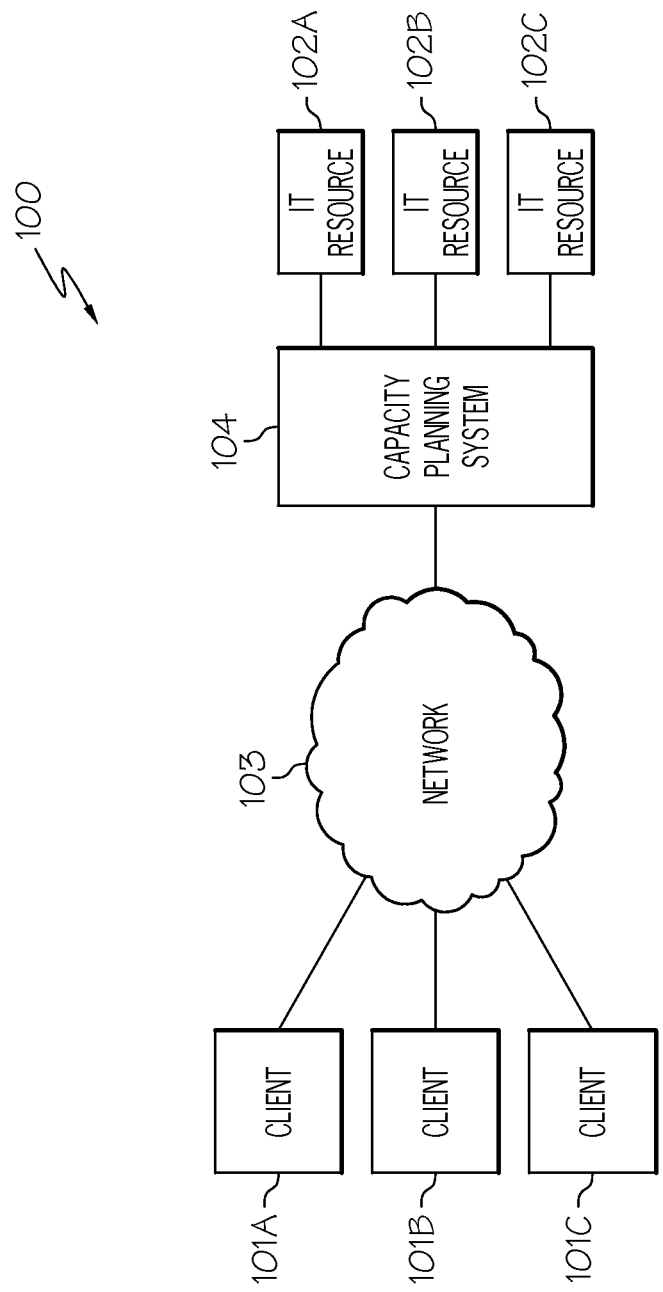
FIG. 1 illustrates an embodiment of the present invention of a network system for practicing the principles of the present invention.

Referring now to the Figures in detail, FIG. 1 illustrates an embodiment of the present invention of a network system 100 for practicing the principles of the present invention. Referring to FIG. 1, network system 100 includes one or more clients 101A-101C, whose requests are serviced or processed by one or more Information Technology (IT) resources 102A-102C via a network 103 (e.g., local area network, wide area network). Clients 101A-101C may collectively or individually be referred to as clients 101 or client 101, respectively. IT resources 102A-102C may collectively or individually be referred to as IT resources 102 or IT resource 102, respectively. Client 101 may be any type of device (e.g., portable computing unit, personal digital assistant (PDA), smartphone, desktop computer system, workstation, Internet appliance and the like) configured with the capability of connecting to network 103 and consequently having its requests (e.g., requesting bank account balance from a financial application) to an application (e.g., financial application) serviced by IT resource 102. IT resource 102 may include any physical or virtual resource (e.g., physical server, virtual machine within a physical container or server) used to service or process a request from client 101.

Network system 100 further includes a capacity planning system 104 configured to predict the capacity requirements for IT resources 102 as discussed in further detail below. While FIG. 1 illustrates capacity planning system 104 interconnected between network 103 and IT resources 102, FIG. 1 is not to be limited in scope to any one particular embodiment. For example, capacity planning system 104 may reside in a different network or cloud. Furthermore, the location of IT resources 102 is not confined to residing in one particular location. They may reside in any location within the IT infrastructure. A description of one embodiment of a hardware configuration of capacity planning system 104 is provided below in connection with FIG. 2.

Figure 2:
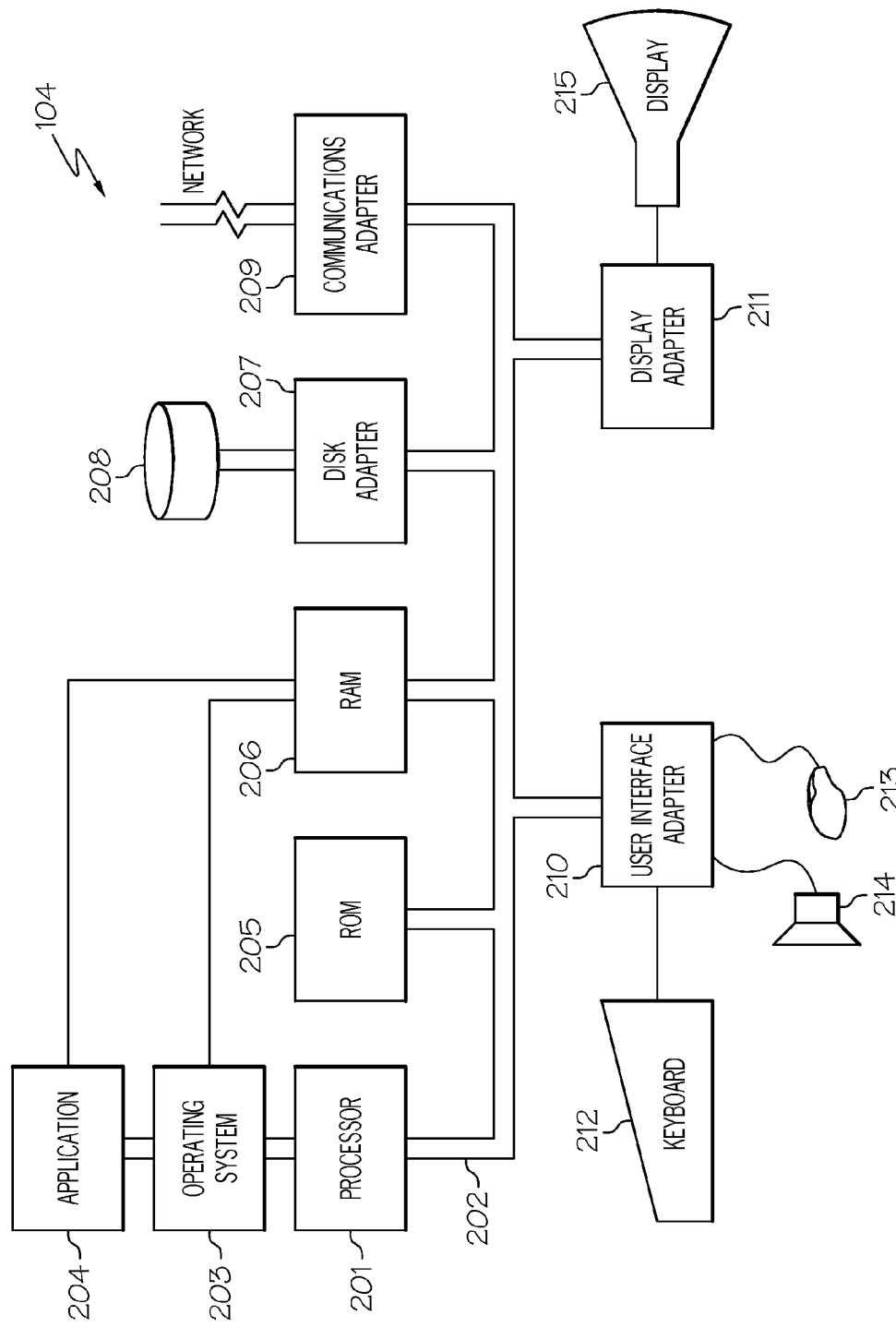
FIG. 2 illustrates the hardware configuration of a capacity planning system configured in accordance with an embodiment of the present invention.

Referring now to FIG. 2, FIG. 2 illustrates a hardware configuration of capacity planning system 104 which is representative of a hardware environment for practicing the present invention. Referring to FIG. 2, capacity planning system 104 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for predicting the capacity requirements for IT resources 102 as discussed further below in association with FIGS. 3-4, 5A-5D, 6 and 7.

Referring again to FIG. 2, read-only memory ("ROM") 205 is coupled to system bus 202 and includes a basic input/output system ("BIOS") that controls certain basic functions of capacity planning system 104. Random access memory ("RAM") 206 and disk adapter 207 are also coupled to system bus 202. It should be noted that software components including operating system 203 and application 204 may be loaded into RAM 206, which may capacity planning system's 104 main memory for execution. Disk adapter 207 may be an integrated drive electronics ("IDE") adapter that communicates with a disk unit 208, e.g., disk drive. It is noted that the program for predicting the capacity requirements for IT resources 102, as discussed further below in association with FIGS. 3-4, 5A-5D, 6 and 7, may reside in disk unit 208 or in application 204.

Capacity planning system 104 may further include a communications adapter 209 coupled to bus 202. Communications adapter 209 interconnects bus 202 with an outside network (e.g., network 103) enabling capacity planning system 104 to communicate with other devices.

I/O devices may also be connected to capacity planning system 104 via a user interface adapter 210 and a display adapter 211. Keyboard 212, mouse 213 and speaker 214 may all be interconnected to bus 202 through user interface adapter 210. Data may be inputted to capacity planning system 104 through any of these devices. A display monitor 215 may be connected to system bus 202 by display adapter 211. In this manner, a user is capable of inputting to capacity planning system 104 through keyboard 212 or mouse 213 and receiving output from capacity planning system 104 via display 215 or speaker 214.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to product a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, traditional capacity planning techniques are often inadequate for accurately predicting resource needs. Often, the amount of IT resources that are expected to be needed by an organization are determined by trial and error. As a result, in many cases, the workload actually encountered by a deployed system does not correspond with a synthetic workload that was expected for the system. Further, workloads often include composite transactions (i.e., a single transaction comprising a plurality of transactions), and determining a resource cost for such composite transactions is challenging for system designers. As a result, IT resources are either underutilized or over-utilized and the excess capacity is stored for emergency situations. If, however, the capacity requirements for IT resources could be accurately predicted, then the IT resources could be used more effectively without over-utilizing or underutilizing these resources.

Figure 3:
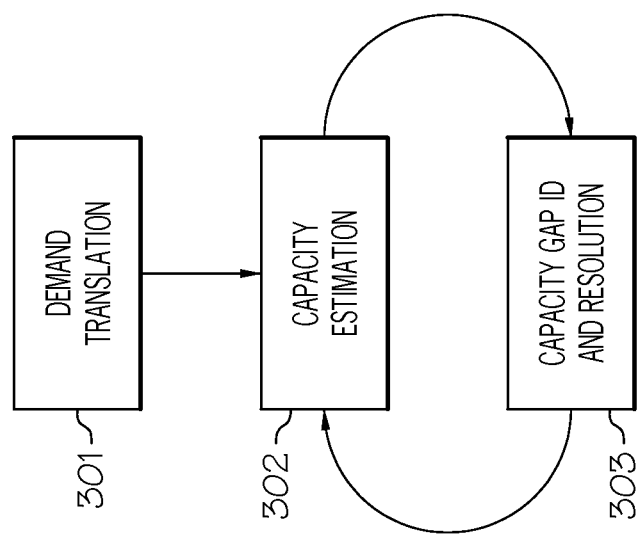
FIG. 3 is a diagram illustrating the macro process for predicting capacity requirements for information technology resources in various environments in accordance with an embodiment of the present invention.
Figure 4:
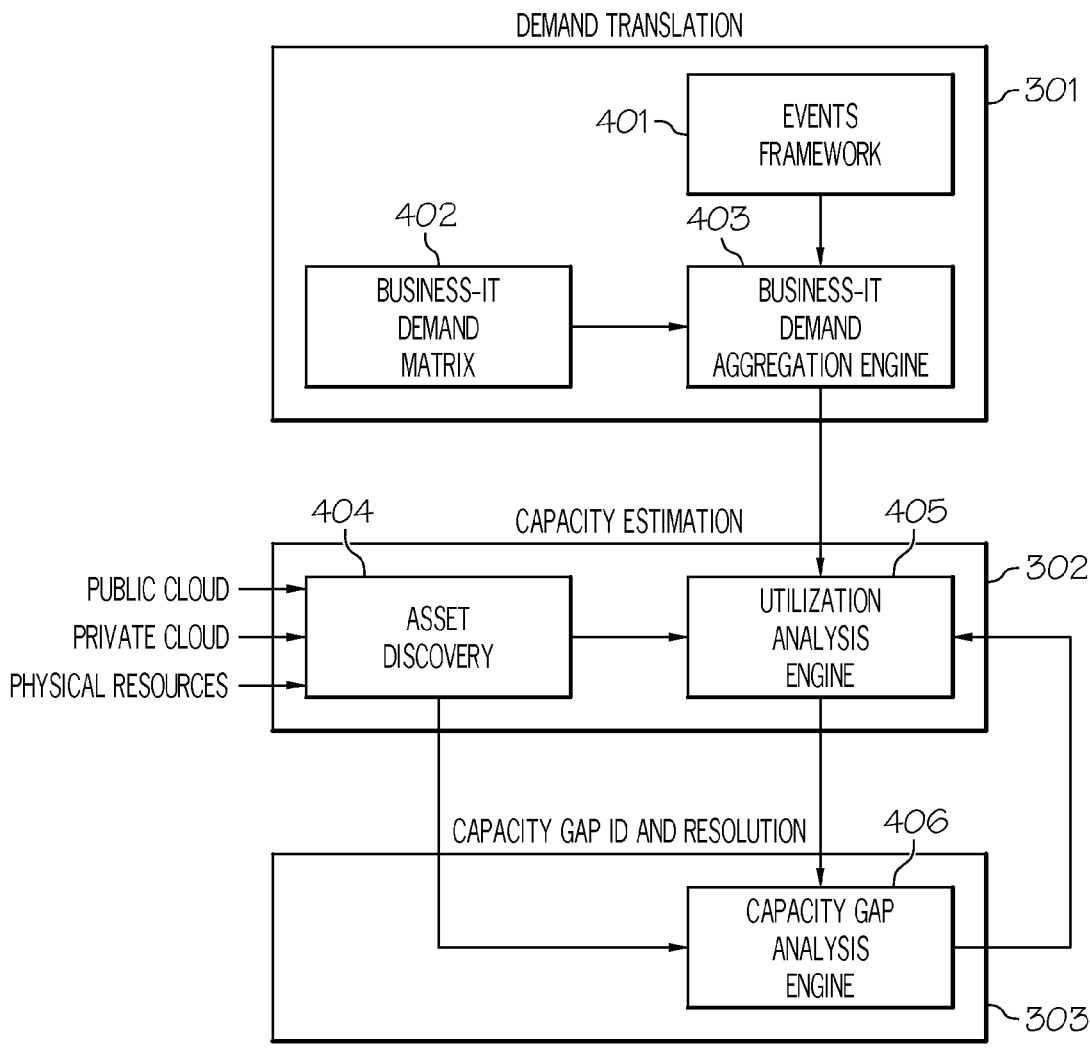
FIG. 4 illustrates the software architecture used for predicting capacity requirements for information technology resources in various environments in accordance with an embodiment of the present invention.
Figure 6:
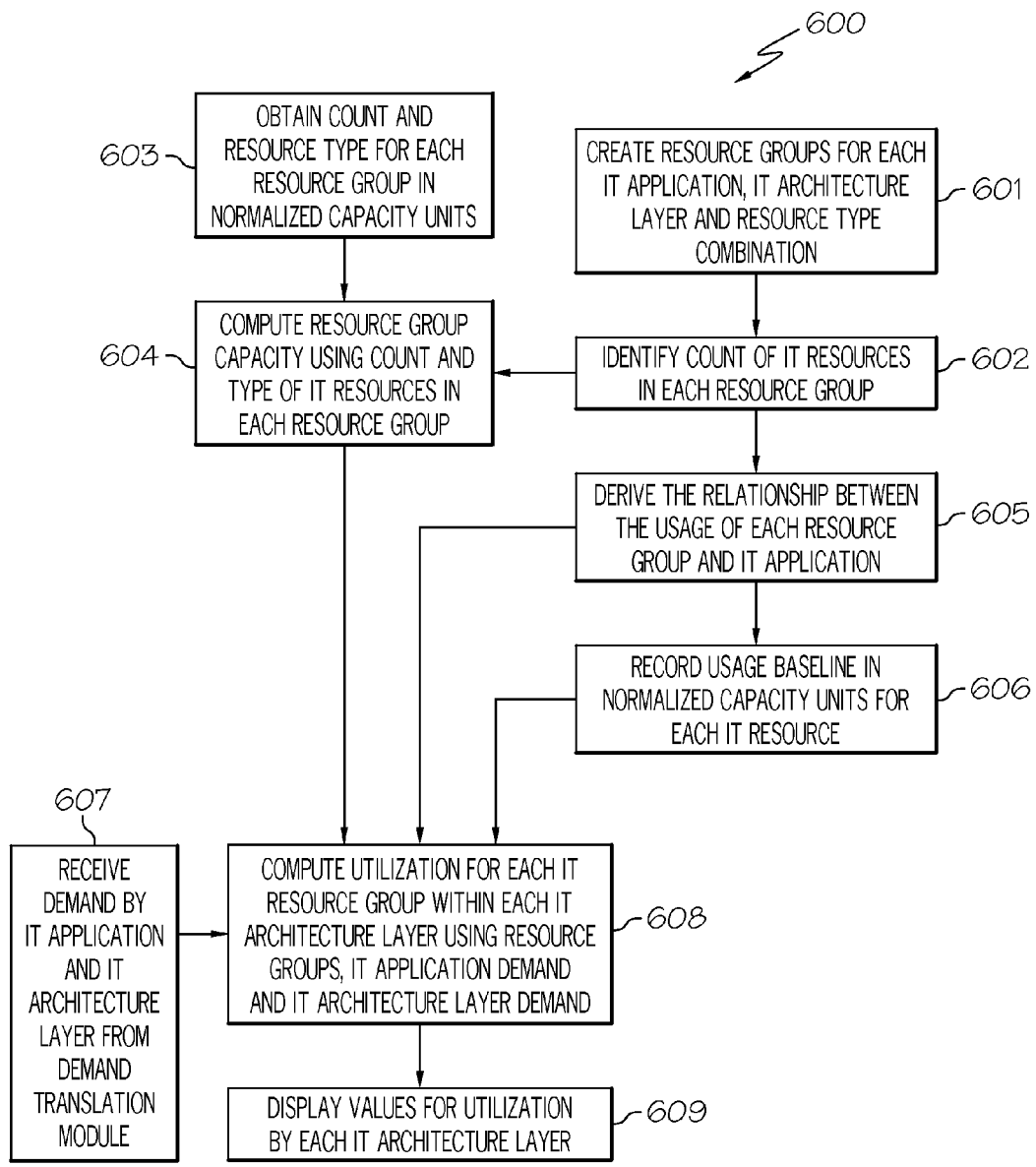
FIG. 6 is a flowchart of a method for estimating the utilization of each IT architecture layer using the capacity estimation module in accordance with an embodiment of the present invention.
Figure 7:
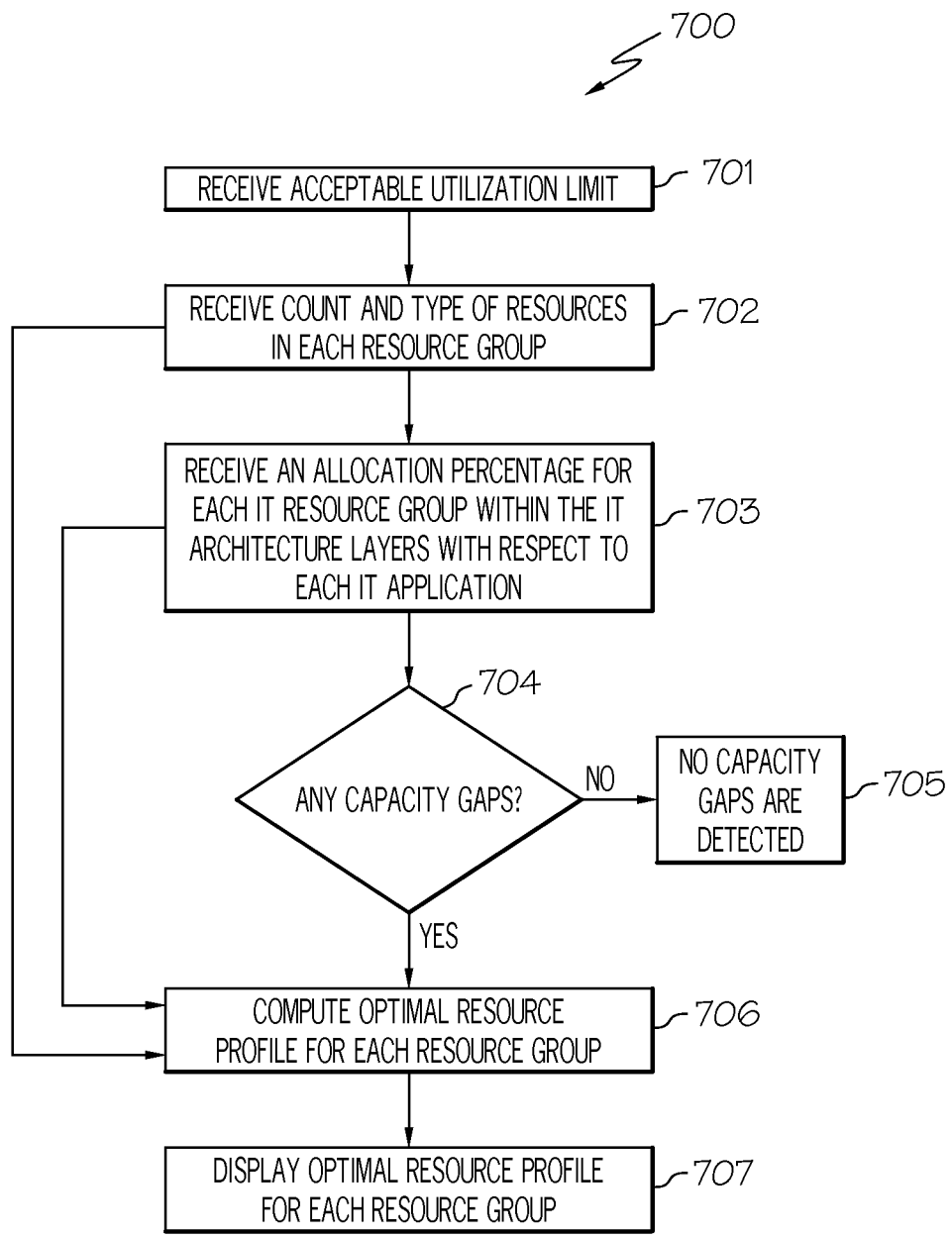
FIG. 7 is a flowchart of a method for identifying capacity gaps (underutilizing or over-utilizing IT resources) and providing resolution options using the capacity gap identification and resolution module in accordance with an embodiment of the present invention.

The principles of the present invention provide a means for accurately predicting capacity requirements for information technology resources in various environments (e.g., physical, virtual, cloud, hybrid cloud) as discussed below in connection with FIGS. 3-4, 5A-D, 6 and 7. FIG. 3 is a diagram illustrating the macro process for predicting capacity requirements for information technology resources in various environments using the software components referred to herein as the "demand translation," "capacity estimation," and "capacity gap identification and resolution." FIG. 4 illustrates the software architecture used for predicting capacity requirements for information technology resources in various environments. FIGS. 5A-5D are a flowchart of a method for forecasting business demand and translating the business demand to IT application demand as well as translating the IT application demand to IT architecture layer demand using the demand translation module. FIG. 6 is a flowchart of a method for estimating the utilization of each IT architecture layer using the capacity estimation module. FIG. 7 is a flowchart of a method for identifying capacity gaps (underutilizing or over-utilizing IT resources 102) and providing resolution options using the capacity gap identification and resolution module.

Referring to FIG. 3, as stated above, FIG. 3 is a diagram illustrating the macro process for predicting capacity requirements for information technology resources in various environments in accordance with an embodiment of the present invention. The macro process is accomplished by the software components, demand translation module 301, capacity estimation module 302 and capacity gap identification and resolution module 303. In one embodiment, these software components may reside in application 204 (FIG. 2).

Capacity planning may be performed by having demand translation module 301 forecast business demand and translate the business demand to IT application demand as discussed in further detail below in connection with FIGS. 4 and 5A-5D. Business demand refers to the demand generated directly by users (e.g., clients 101) upon the business organization. For example, the number of requests for food stamps is a business demand for a state's food stamp agency. In another example, the number of calls is a business demand for a call center. IT application demand refers to the demand being imposed on an application being serviced by an IT resource 102 (FIG. 1). For example, the number of financial requests is an IT application demand for a financial application being serviced by IT resource 102. Demand translation module 301 may further translate the IT application demand into the IT architecture layer demand. IT architecture layer demand refers to the demand being imposed on an architecture layer of an IT application. Architecture layer refers to the logical layers (e.g., web server layer, security server layer, application server layer, database server layer, storage layer, network layer) of an IT application that are used to service particular requests (e.g., Hypertext Transfer Protocol (HTTP) requests, Structured Query Language (SQL) requests, Enterprise JavaBeans (EJB) requests) issued by clients 101.

Once the business demand and IT application demand have been translated, the capacity of IT resources 102 handling such demand may be estimated using capacity estimation module 302 as will be discussed in further detail below in connection with FIGS. 4 and 6. In particular, capacity estimation module 302 estimates the utilization of each IT architecture layer.

Any gaps in capacity, whether the IT resources 102 are being underutilized or over-utilized, may be identified using capacity gap identification and resolution module 303. Such gaps may be reduced or eliminated based on recommendations (e.g., change number of IT resources 102 servicing IT application, change percentage of capacity being used by particular IT resource 102 servicing a particular IT application) generated by capacity gap identification and resolution module 303. Such recommendations may be implemented whereby capacity estimation module 302 re-estimates the utilization of each IT architecture layer. This process may be repeated numerous times as illustrated in FIG. 3 by the arrows pointing between capacity estimation module 302 and capacity gap identification and resolution module 303.

The macro process described above may be recalibrated whenever necessary. Recalibration refers to obtaining newer, more up-to-date, demand metrics for the business components, IT applications and IT architecture layers used by demand translation module 301. A more detailed description of using such metrics, and the hierarchy of such metrics, is discussed further below in connection with FIGS. 5A-5D.

The software architecture illustrating the use of these software components for predicting capacity requirements for information technology resources in various environments is discussed below in connection with FIG. 4.

FIG. 4 illustrates the software architecture used for predicting capacity requirements for information technology resources in various environments in accordance with an embodiment of the present invention.

Referring to FIG. 4, demand translation module 301 may include the sub-modules referred to herein as the events framework module 401, the business-IT demand matrix module 402 and the business-IT demand aggregation engine 403.

Capacity estimation module 302 may include an asset discovery module 404 and a utilization analysis engine 405.

Capacity gap identification and resolution module 303 may include a capacity gap analysis engine 406.

A detailed description of the functionality of each of the modules of the software architecture as well as their interrelationship will be discussed below in connection with the flowcharts (FIGS. 5A-5D, 6 and 7) describing the process performed by each of the modules of the macro process.

FIGS. 5A-5D are a flowchart of a method 500 for forecasting business demand and translating the business demand to IT application demand as well as translating the IT application demand to IT architecture layer demand using demand translation module 301 (FIGS. 3 and 4) in accordance with an embodiment of the present invention.

Figure 5A:
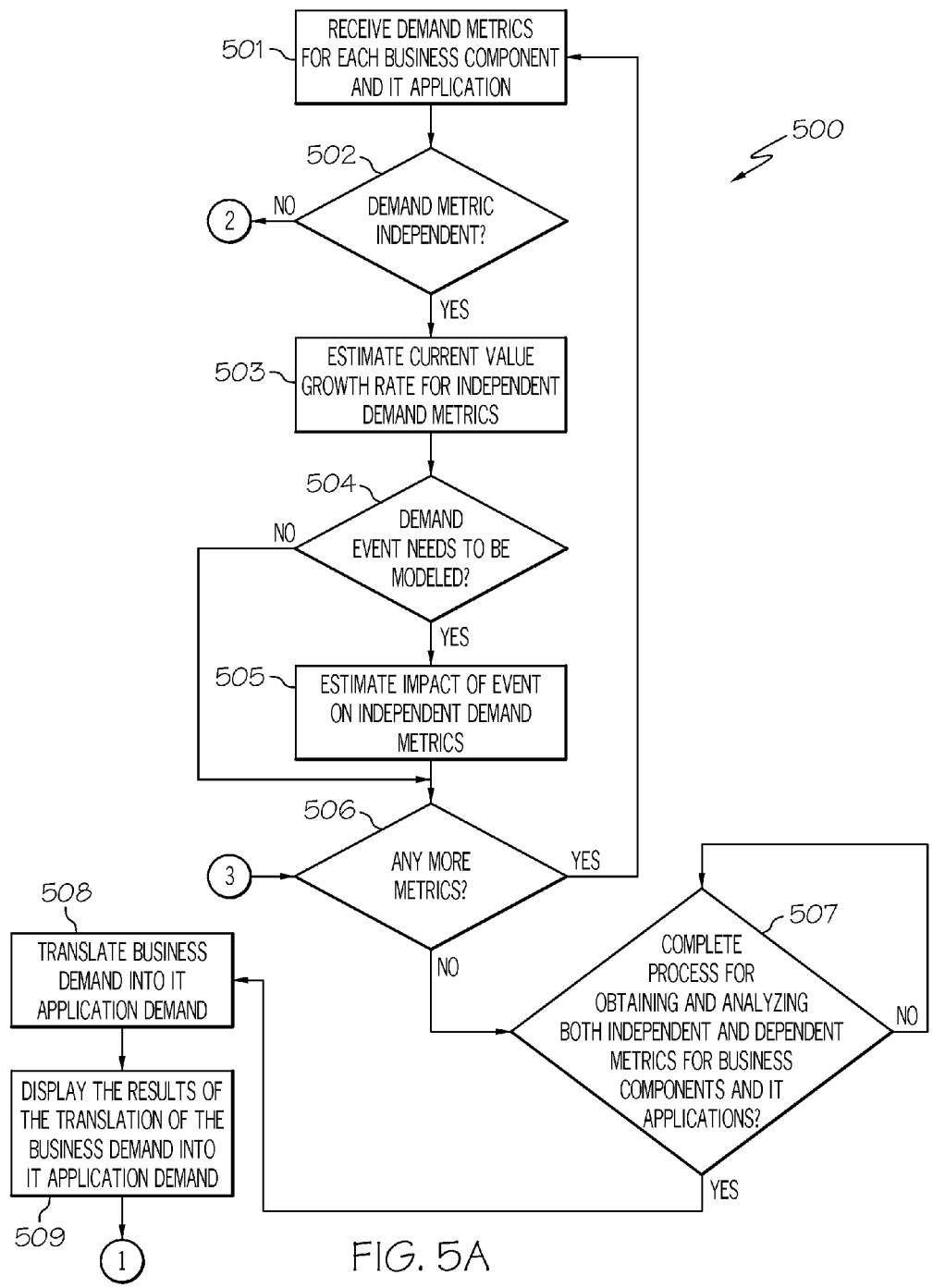
FIGS. 5A-5D are a flowchart of a method for forecasting business demand and translating the business demand to IT application demand as well as translating the IT application demand to IT architecture layer demand using the demand translation module in accordance with an embodiment of the present invention.

Referring to FIG. 5A, in conjunction with FIGS. 1-4, in step 501, the demand metrics for each business component and IT application are identified and received by demand translation module 301. The principles of the present invention use what is referred to herein as a "metric hierarchy" which includes a hierarchy of business components, IT applications and IT architecture layers. Business components refer to a branch, division or section, such as a department, of a business that is servicing requests from clients 101. For example, the health and human services department of a state agency may be servicing Medicaid requests. The health and human services department would be the business component. In another example, a call center of an enterprise may be considered to be a business component servicing requests from clients 101 (e.g., questions regarding the use of a product sold by the business). As discussed above, an IT application refers to an application (e.g., financial application) that is processing requests from clients 101 where such an application is being serviced by an IT resource 102. An IT architecture layer refers to the logical layers (e.g., web server layer, security server layer, application server layer, database server layer, storage layer, network layer) of an IT application that are used to service particular requests (e.g., Hypertext Transfer Protocol (HTTP) requests, Structured Query Language (SQL) requests, Enterprise JavaBeans (EJB) requests) issued by clients 101. The "demand metrics" for the business component and IT application refer to a quantifiable value attributed to the demand being put on the business component and IT application. For example, the number of calls received by the call center during a period of time may represent the demand for the business component of the call center. In another example, the transaction volume, such as the number of requests, being serviced by a financial application during a period of time may represent the demand for the IT application.

In step 502, demand translation module 301 determines whether such a demand metric, identified and received in step 501, is independent. A demand metric may be dependent upon other metrics. For example, the number of calls handled by the health and human services department of a state agency may be dependent upon the number of cases being handled by the heath and human services department. As a result, it may be said that the demand metric for the number of calls is dependent upon the demand metric for the number of cases being handled. If, however, the demand metric is not dependent upon other metrics, then it is classified as being independent. In one embodiment, step 502 and the following steps, steps 503-505, are performed for each demand metric identified and received in step 501.

If the demand metric is independent, then, in step 503, demand translation module 301 estimates the current value and growth rate for the independent demand metric. For example, the trend of the demand metric may be obtained based on the values of the demand metric over a period of time. For example, the demand metric for the IT application of a financial application may be trending upward from 2,000 requests during the time of 9:00 AM to 10:00 AM to 3,000 requests during the time of 10:00 AM to 11:00 AM. Such information is useful in understanding and evaluating the capacity requirements for servicing such requests.

In step 504, events framework 401 determines whether a demand event needs to be modeled. "Demand event" refers to an event, expected or unexpected, that may be taken into account to impact the independent demand metric. For example, a demand event may be seasonal (e.g., Christmas), natural disasters, product recalls, rolling blackouts, sporting events (e.g., Super Bowl), etc. Such an event may have an impact on the independent demand metric. For example, the number of sales of a merchandiser may be quite a bit higher during the Christmas season than other times during the year. Such an impact should be quantified in order to obtain a more accurate prediction of the demand being imposed on such a business.

If the demand event needs to be modeled, then, in step 505, events framework 401 estimates the impact of the event on the independent demand metrics. For example, the sales of a merchandiser may be estimated to be 300% greater in the month of December than the sales in the month of July due to the event of Christmas.

If, however, there are no demand events that need to be modeled, or upon executing step 505, then, in step 506, demand translation module 301 determines whether there are more metrics for the business components and IT applications to be identified and received. If so, then further demand metrics for each business component and IT application are identified and received by demand translation module 301 in step 501.

If, however, there are no further demand metrics for the business components and IT applications to be received, then, in step 507, demand translation module 301 determines whether the process for obtaining and analyzing both independent and dependent metrics for business components and IT applications is completed. If not, a subsequent determination is made as to whether such a process has been completed.

If the process for obtaining and analyzing both independent and dependent metrics for business components and IT applications is completed, then, in step 508, the business-IT demand aggregation engine 403 translates the business demand into IT application demand using the following algorithm (EQ 1):

Step 1: Intialize $t = -1, I = \phi$

Step 2: $t = t + 1$ $i = 0, I = I + \{i\}$ $BD_{mti} = curVal_m(1 + growth_m)^t(1 + eventImpact_{emt})$ $\forall m \in M^{indep}$ Step 3: $i = i + 1, I = I + \{i\}$ $BD_{mti} = \left(\sum_{m' \in M}[bSlope_{mm'} BD_{m'ti-1}]\right) + bIntercept_m]$ $\forall m \in M^{dep}$ If $\sum_{m \in M} BD_{mti} = 0$, then go to step 4. Else repeat step 3.

Step 4: $BD_{mt} = \sum_{i \in I} BD_{mti}$

If $t + 1 > |T|$, then STOP. Else go to Step 2.

where M is a set of demand metrics, $M^{indep}$ is a subset of demand metrics that are independent, $M^{dep}$ is a subset of demand metrics that are dependent on other demand metrics, I is a set of iterations, $bSlope_{m,m'}$ is a slope parameter of m with respect to m', $bIntercept_m$ is an intercept parameter of m with respect to all the metrics it depends on, $curVal_m$ is a current or starting value of m, $growth_m$ is a growth rate % per time period of m, $eventImpact_{e,m,t}$ is a change % of m due to event e in time t, $B\hat{D}mti$ is demand type m generated in time t in iteration I, and $BD_{m,t}$ is a resulting demand of m in time t.

In step 509, the business-IT demand aggregation engine 403 displays the results of the translation of the business demand into IT application demand.

Figure 5B:
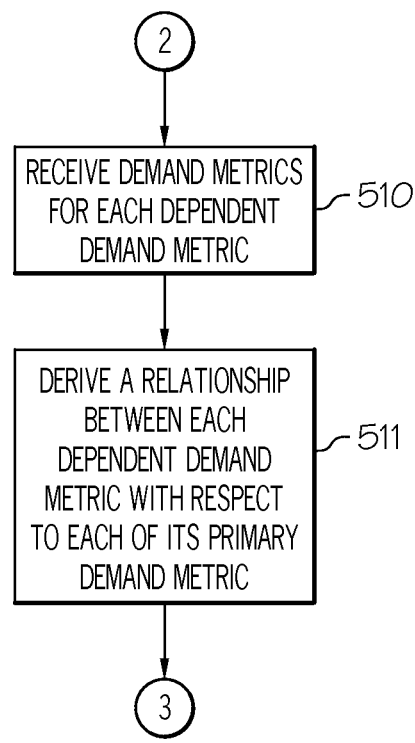

Referring to step 502, if, however, the demand metric for the business component or IT application is dependent, then, referring to FIG. 5B, in conjunction with FIGS. 1-4, in step 510, the business-IT demand matrix 402 receives the demand metrics for each dependent business component or IT application. As discussed above, a dependent demand metric may be dependent upon other metrics. For instance, referring to the example above in connection with a health and human service department, the number of calls may be dependent upon the demand metric for the number of cases being handled. As a result, the metrics for both the number of calls and the number of cases being handled (referred to as a "primary demand") are identified and received. Primary demand refers to the demand metric that influences another demand metric.

In step 511, the business-IT demand matrix 402 derives a relationship between each dependent demand metric with respect to each of its primary demand metric. As discussed above, there may be a relationship between a primary demand metric (e.g., number of cases being handled) and its dependent demand metric (e.g., number of calls). When such a case occurs, it is useful to determine its relationship in order to more accurately determine the demand for the dependent demand metric. In one embodiment, such a relationship may be linear or non-linear. When the relationship is linear, a linear function may be derived by estimating a slope and intercept using the demand metrics for both the primary demand and dependent demand.

Upon executing step 511, referring to FIG. 5A, demand translation module 301 determines whether there are more metrics for the business components and IT applications to be identified and received in step 506.

Figure 5C:
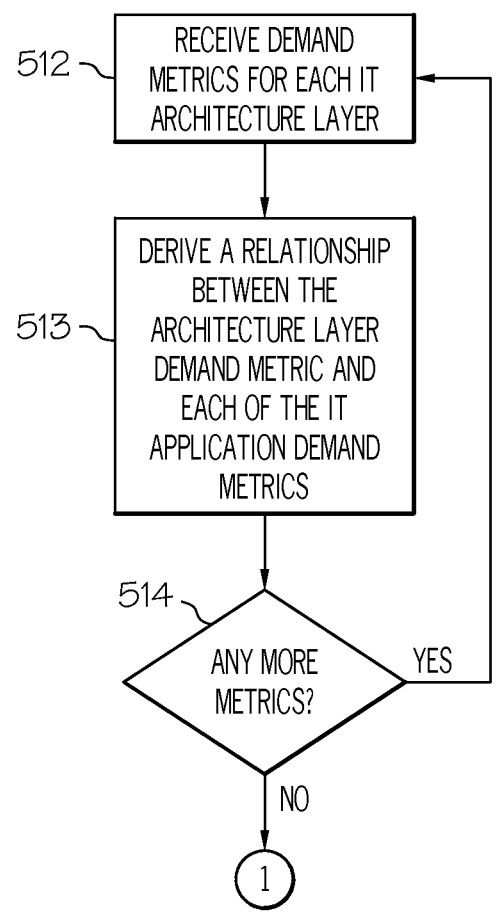

Referring now to FIG. 5C, in step 512, which may be executed in parallel with the execution of step 501, the demand metrics for each application architecture layer is identified and received by demand translation module 301. As discussed above, an IT architecture layer refers to the logical layers (e.g., web server layer, security server layer, application server layer, database server layer, storage layer, network layer) of an IT application that are used to service particular requests (e.g., Hypertext Transfer Protocol (HTTP) requests, Structured Query Language (SQL) requests, Enterprise Java-Beans (EJB) requests) issued by clients 101. The "demand metrics" for the IT architecture layer refer to the demand being placed on a logical layer (e.g., network layer) of an IT application.

In step 513, business-IT demand matrix 402 derives a relationship between the architecture layer demand metric (e.g., number of transactions being serviced by application server layer) and each of the IT application demand metrics (e.g., number of requests being received by a financial application). For example, the number of transactions being serviced by an application server layer (architectural layer demand metric) may be related to the number of requests being received by a financial application (IT application demand metric). Since there is a relationship between the architecture layer and the IT application, it is useful to determine its relationship in order to more accurately determine the demand for the IT application and IT architecture layer. In one embodiment, such a relationship may be linear or non-linear. When the relationship is linear, a linear function may be derived by estimating a slope and intercept using the demand metrics for both the IT application and IT architecture layer.

In step 514, demand translation module 301 determines whether there are more metrics for the IT architecture layer to be identified and received. If so, then further demand metrics for each IT architecture layer are identified and received by demand translation module 301 in step 512.

Figure 5D:
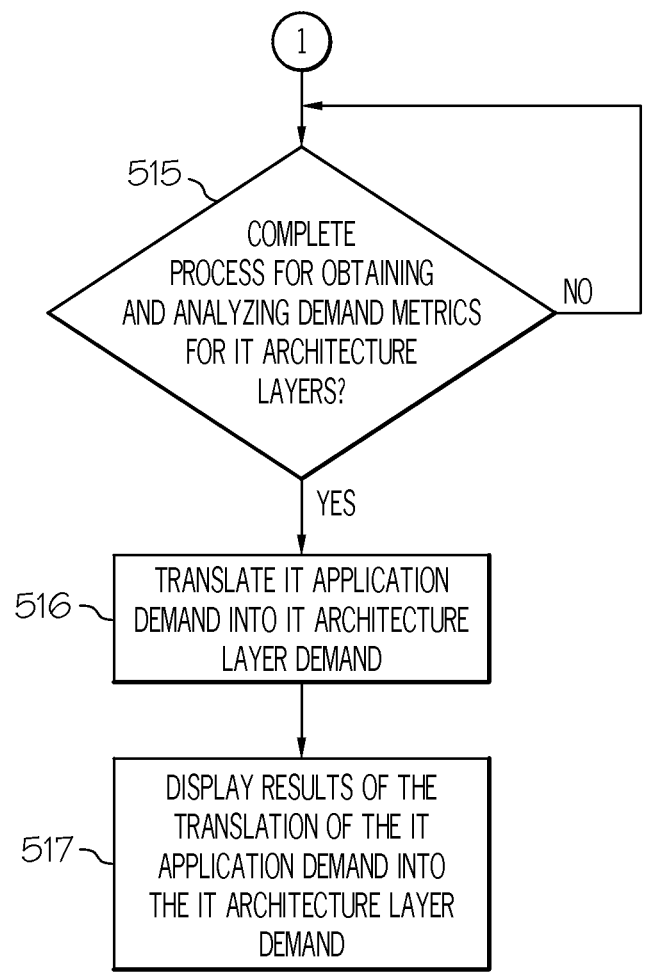

If, however, there are no further demand metrics for the IT architecture layers to be received, and, upon executing step 509 of FIG. 5A, referring to FIG. 5D, in step 515, demand translation module 301 determines whether the process for obtaining and analyzing demand metrics for IT architecture layers is completed. If not, a subsequent determination is made as to whether such a process has been completed.

If the process for obtaining and analyzing demand metrics for IT architecture layers is completed, then, in step 516, the business-IT demand aggregation engine 403 translates the IT application demand into the IT architecture layer demand using the following algorithm (EQ 2):

Step 1: Initialize $t=-1$

Step 2: $t=t+1$ $ID_{l,a,t} = BD_{m,t} \cdot lSlope_{l,a} + lIntercept_{l,a} \forall m \in M \cup A, \forall a \in A, l \in L, t \in T$ If $t+1 > |T|$, then STOP. Else repeat Step 2.

where M is a set of demand metrics, I is a set of iterations, T is a set of time periods, A is a set of applications, A is a subset of M, L is a set of IT architecture layers, $lSlope_{l,a}$ is a slope parameter of layer/with respect to A, $lIntercept_{l,a}$ is an intercept parameter of layer/with respect to A, $BD_{m,t}$ is the resulting demand of m in time t, and the $ID_{l,a,t}$ is the resulting demand of application a on layer l in time t.

In step 517, the business-IT demand aggregation engine 403 displays the results of the translation of the IT application demand into the IT architecture layer demand.

The algorithms discussed above are automatically recalibrated for variations in monitored data values instead of using outdated results thereby generating results that are up-to-date which can be used for decision support on a daily basis.

In some implementations, method 500 may include other and/or additional steps that, for clarity, are not depicted. Further, in some implementations, method 500 may be executed in a different order presented and that the order presented in the discussion of FIGS. 5A-5D is illustrative. Additionally, in some implementations, certain steps in method 500 may be executed in a substantially simultaneous manner or may be omitted.

The output of demand translation module 301 may be used by capacity estimation module 302 to estimate the utilization of each IT architecture layer as discussed below in connection with FIG. 6.

FIG. 6 is a flowchart of a method 600 for estimating the utilization of each IT architecture layer using capacity estimation module 302 (FIGS. 3 and 4) in accordance with an embodiment of the present invention.

Referring to FIG. 6, in conjunction with FIGS. 1-4, in step 601, asset discovery 404 creates, what is referred to herein as "resource groups," for each IT application, IT architecture layer and resource type combination in various environments (e.g., public cloud, private cloud, physical, virtual, hybrid cloud). Resource groups may refer to a collection of identical IT resources 102 that can be shared in a manner that allows the resource group to service multiple IT applications. For example, suppose there are ten identical database servers. Four of the ten database servers may form one resource group as they are shared to support financial and health and human service applications. The other six database servers may form one resource group dedicated to support a third type of application. Resource type refers to the particular model/specification/manufacturer details of IT resource 102 (e.g., Sun Fire E2900 server) being used in the resource group.

In step 602, asset discovery 404 identifies the count of the IT resources 102 in each resource group. Count, as used herein, refers to the number of the specific IT resource (e.g., Sun Fire E2900 server) being used in the resource group.

In step 603, which may be executed in parallel with step 601, capacity estimation module 302 obtains the count and resource type for each resource group in normalized capacity units. In one embodiment, the IT resources 102 being used in a resource group along with the applications supported by such IT resources 102 may be stored in a data structure, such as a table. The table may be configured to store such information for all resource groups. In an attempt to standardize the performance units across various types of IT resources 102, the performance units may be normalized thereby making it possible to compare the performance of one IT resource 102 with respect to another IT resource 102 in another resource group.

In step 604, using the information acquired in steps 602 and 603, asset discovery 404 computes the resource capacity using the count and type of IT resources 102 in each resource group using the following algorithm (EQ 3):

$CAP_{rg,t} = resCount_{rg,t} capRt_{resType_{rg}} \forall rg \in RG, \forall t \in T$ where T is a set of time periods, RT is a set of resource types, RG is a set of resource groups, $resCount_{rg,t}$ is the resource count of resource group rg in time t, and $CAP_{rg,t}$ is the capacity of resource group rg in time t.

Upon identifying the count of IT resources 102 in each resource group in step 602, in step 605, asset discovery 404 derives the relationship between the usage of each resource group and IT application. It is useful to determine such a relationship in order to more accurately determine the utilization of IT resources 102. In one embodiment, such a relationship may be linear or non-linear.

In step 606, asset discovery 404 records a usage baseline in normalized capacity units for each IT resource 102. At the time of testing IT resource 102 to determine its performance profile, the performance units may be normalized. As discussed above, such normalized units for IT resource 102 may be stored or recorded in a table.

In one embodiment, steps 605 and 606 are performed for each IT architecture layer.

In step 607, capacity estimation module 302 receives the demand by IT application and IT architecture layer from demand translation module 301.

In step 608, utilization analysis engine 405, using the inputs from steps 604, 605, 606 and 607, computes the utilization for each IT resource group within each IT architecture layer using the following algorithm (EQ 4):

$$UTILAppRg_{rg,a,t} =$$

$$\left( uSlope_{rg,a} \sum_{i \in L^{rg}} ID_{i,a,t} + uIntercept_{rg,a} \right) \frac{uBaseline_{rg}}{CAP_{rg,t}} \forall\, rg \in RG \ni$$

$$CAP_{rg} > 0, \forall\, a \in A^{rg}, \forall\, t \in T$$

$$UTILRg_{rg,t} = \sum_{a \in A^{rg}} UTILAppRg_{rg,a,t} \forall\, rg \in RG, t \in T$$

$$UTILLyr_{l,t} = \max_{rg \in RG}(UTILRg_{rg,t}) \forall\, l \in L^{RG}, t \in T$$

where T is a set of time periods, RG is a set of resource groups, $A^{rg}$ is a set of application(s) associated with resource group rg, $L^{rg}$ is a set of layers associated with resource group rg, lIntercept$_{l,m}$ is an intercept parameter of layer l with respect to metric m where m∈$M^{ITApp}$, uSlope$_{rg,a}$ is a usage slope of application a on resource group rg, uIntercept$_{rg,a}$ is a usage intercept of application a on resource group rg, uBaseline$_{rg}$ is a utilization baseline value of resource group rg, $CAP_{rg,t}$ is a capacity of resource group rg in time t, $ID_{l,a,t}$ is a resulting demand of application a on layer l in time t, UTILAppRg$_{rg,a,t}$ is a utilization of resource group rg by application a in time t, UTILRg$_{rg,t}$ is a utilization of resource group rg in time t, and UTILLyr$_{l,t}$ is a utilization of layer l in time t.

In step 609, utilization analysis engine 405 displays the values for the utilization by each IT architecture layer.

The algorithms discussed above are automatically recalibrated for variations in monitored data values instead of using outdated results thereby generating results that are up-to-date which can be used for decision support on a daily basis.

In some implementations, method 600 may include other and/or additional steps that for clarity, are not depicted. Further, in some implementations, method 600 may be executed in a different order presented and that the order presented in the discussion of FIG. 6 is illustrative. Additionally, in some implementations, certain steps in method 600 may be executed in a substantially simultaneous manner or may be omitted.

The output of capacity estimation module 302 may be used by capacity gap identification and resolution module 303 to identify under or over-utilization of IT resources 102 and to propose modifications to more effectively utilize IT resources 102 as discussed below in connection with FIG. 7.

FIG. 7 is a flowchart of a method 700 for identifying capacity gaps (underutilizing or over-utilizing IT resources 102) and providing resolution options using capacity gap identification and resolution module 303 (FIGS. 3 and 4) in accordance with an embodiment of the present invention.

Referring to FIG. 7, in conjunction with FIGS. 1-4, in step 701, capacity gap analysis engine 406 receives an acceptable utilization limit.

In step 702, capacity gap analysis engine 406 receives the count and type of IT resources 102 in each resource group from capacity estimation module 302.

In step 703, capacity gap analysis engine 406 receives an allocation percentage for each IT resource group within the IT architecture layers with respect to each IT application from capacity estimation module 302. Allocation refers to the planned utilization for the shared resources in the IT resource group.

In step 704, capacity gap analysis engine 406 determines whether there are any capacity gaps using the received information in steps 701-703. Capacity gaps refer to herein as either under or over-utilization of IT resources 102. Such a determination is made in part based on the acceptable utilization limit and the current utilization of IT resources 102 in connection with IT application layers and resource groups. In one embodiment, capacity gap analysis engine 406 determines whether there are any capacity gaps using the following algorithm (EQ 5):

Step 1: If $\max_{l \in L}\{UTILLyr_{l,t}\} < maxUtil$, then STOP.

Else $\hat{l}_t = \operatorname{argmax}_{l \in L}\{UTILLyr_{l,t}\}$ and go to Step 2.

Step 2: $\hat{rg}_t = \operatorname{argmax}_{rg \in RG^{\hat{l}}}\{UTILRg_{rg,t}\}$ where maxUtil is the global utilization threshold, UTILRg$_{rg,t}$ is the utilization of resource group rg in time t, and UTILLyr$_{l,t}$ is the utilization of layer l in time t.

Instead of attempting to determine if IT resources 102 are being under/over utilized by trial and error, capacity gaps are determined by testing only the critical layers, thereby greatly reducing the computation time.

If there are no capacity gaps, then, in step 705, no capacity gaps are identified.

If, however, a capacity gap is identified, then, in step 706, capacity gap analysis engine 406, using the inputs from steps 702 and 703, computes the optimal resource profile for each resource group. That is, capacity gap analysis engine 406 computes the appropriate count and utilization for each IT resource group to service each IT application in that resource group. For example, suppose the resource group has two identical servers that are used to service a financial application and a health and human services application. Suppose further that the first server utilizes 100 percent of its computing capacity to service the financial application and the second server utilizes 50 percent of its computing capacity to service the financial application and the other 50 percent to service the health and human services application. Capacity gap analysis engine 406 may generate an optimal resource profile which may change the count or number of IT resources 102 (e.g., change the number of servers to three from two) and/or may reallocate the sharing or allocation of IT resources 102 servicing an application (e.g., the second server may now be recommended to share or allocate 75 percent of its computing capacity to service the health and human services application and only 25 of its computing capacity to service the financial application). Capacity gap analysis engine 406 computes the optimal resource profile for each resource group using the following algorithm (EQ 6):

Step 1: $a_t = \operatorname{argmax}_{a \in A^{rg}}\{UTILAppRg_{\hat{rg},a,t}\}$ where $\hat{rg}$ in indentified in Bottleneck Identification Algorithm $newResCountRg_{\hat{rg},t} = \left\lceil \dfrac{UTILRg_{\hat{rg},t} * resCount_{\hat{rg},t}}{maxUtil} \right\rceil$ $newResCountAppRg_{\hat{rg},a,t} = \left\lceil \dfrac{UTILAppRg_{\hat{rg},a,t} * resCount_{\hat{rg},t}}{maxUtil} \right\rceil$ $\forall a \in A^{\hat{rg}}$ Step 2: If $UTILAppRg_{\hat{rg},\hat{a},t} \geq maxUtil$ and $\sum_{a \in A^{\hat{rg}} \setminus a} UTILAppRg_{\hat{rg},a,t} > 0$ then $newResCountRg_{\hat{rg},t} \leq \sum_{a \in A^{\hat{rg}}} newResCountAppRg_{\hat{rg},a,t}$ then If $NEWResCountRg_{\hat{rg},t} = newResCountRg_{\hat{rg},t}$ (keep together)

Else split into $\sum_{a \in A^{\hat{rg}}} 1$ groups with $NEWResCountAppRg_{\hat{rg},a,t} = newResCountAppRg_{\hat{rg},a,t} \forall a \in A^{\hat{rg}}$ Else $NEWResCountRg_{\hat{rg},t} = newResCountRg_{\hat{rg},t}$ where $A^{rg}$ is the set of application(s) associated with resource group rg, resCount$_{rg,t}$ is the resource count of resource group rg in time t, maxUtil is the global utilization threshold, newResCountRg$_{rg,t}$ is the new calculated resource count of resource group rg in time t, newResCountAppRg$_{rg,a,t}$ is the new calculated resource count of resource group rg for application a in time t, UTILAppRg$_{rg,a,t}$ is the utilization of resource group rg by application a in time t, UTILRg$_{rg}$, is the utilization of resource group rg in time t, NEWResCountRg$_{rg,t}$ is the new best resource count of resource group rg in time t, and NEWResCountAppRg$_{rg,a,t}$ is the new best resource count of resource group rg for application a in time t.

In step 707, capacity gap analysis engine 406 displays the computed optimal resource profile for each resource group. In this manner, capacity gap identification and resolution module 303 instantly shows the business impact of simulated options.

In the steps described above, capacity gap analysis engine 406 identifies capacity gaps and resolves them sequentially through simulation and optimization. That is, capacity gap analysis engine 406 simulates the changes to the resource profile (e.g., change number of IT resources in resource group, change allocation of IT resource 102 servicing a particular application) which is instantly displayed to the user letting the user instantly view the business impact of simulated options on a single screen.

In some implementations, method 700 may include other and/or additional steps that for clarity, are not depicted. Further, in some implementations, method 700 may be executed in a different order presented and that the order presented in the discussion of FIG. 7 is illustrative. Additionally, in some implementations, certain steps in method 700 may be executed in a substantially simultaneous manner or may be omitted.

The algorithms described above in connection with Equations 1-6 can be applied to resources that could be physical or virtual, such as those provided in private and public clouds. A "cloud" refers to a collection of virtual IT resources that conform to an application architecture where demand is processed by virtualized resources. When the physical resources that contain the virtual resources are not shared with other organizations, the cloud is said to be a "private cloud," whereas, a "public cloud," has physical resources that are shared with other organizations. Additionally, the algorithms described above can be applied to resources in a hybrid architecture. A hybrid architecture refers to a collection of IT resources that conform to an application architecture where the processing of application demand is split between two or more types of architectures. For example, some organizations might choose to have a physical/cloud hybrid architecture where some of their old single tenant applications run on their existing physical architecture while they transition to a new cloud architecture. In another example, organizations with security concerns may choose to have a private cloud/public cloud hybrid architecture where data sensitive applications are processed in the internal private cloud, whereas, the external web applications may be processed in the public cloud.

Furthermore, as discussed above in connection with FIGS. 5A-5D, 6 and 7, as a first pass, users can forecast demand, predict capacity, analyze capacity gaps and view gap resolution recommendations. These may be said to fall under "evaluation." In one embodiment, additional steps may be employed to "simulate" and "optimize." The models discussed herein create the framework over which simulation and optimization is possible. Users may take additional steps to simulate and optimize, such as the following: simulate variations of demand forecasts based on more/less events; simulate utilization and capacity gaps as a result; simulate capacity gaps if more/less resources are used (which may be different from what was recommended by the capacity gap analysis engine 406); recalibrate the relationships based on the observed demand and utilization values; optimize the capacity levels and sharing for maximum business value.

Hence, "simulating," "optimizing" and "recalibrating" (discussed further above) are additional capabilities to "evaluation."

By using the principles of the present invention, future capacity gaps can be predicted instead of simply estimating current capacity issues. Furthermore, forecasts can be recalibrated based on monitored data values instead of using outdated results. Additionally, the impact of events can be predicted instead of planning based on current knowledge and hoping for the best in the future. In addition, by having the concept of resource groups, IT resources can be shared across multiple applications, which is increasingly important due to the increase of resource sharing as a result of virtualization and cloud computation. Furthermore, by using the principles of the present invention, capacity planning is integrated across various resources, such as servers, storage and network, instead of being planned across independent resources.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims.

The invention claimed is:

1. A method for accurately predicting capacity requirements for information technology resources, the method comprising:

translating business demand into information technology application demand,
   wherein said business demand is translated into said information technology application demand using the following algorithm:

Step 1: Initialize $t = -1$, $I = \phi$

Step 2: $t = t + 1$ $i = 0, I = I + \{i\}$ $B\hat{D}_{mti} = curVal_m(1 + growth_m)^t(1 + eventImpact_{emt})$ $\forall m \in M^{indep}$ Step 3: $i = i + 1, I = I + \{i\}$ $B\hat{D}_{mti} = \left( \sum_{m' \in M} bSlope_{mm'} B\hat{D}_{m'ti-1} \right) + bIntercept_m \forall m \in M^{dep}$ If $\sum_{m \in M} B\hat{D}_{mti} = 0$, then go to step 4. Else repeat step 3, Step 4: $BD_{mt} = \sum_{i \in I} B\hat{D}_{mti}$ If $t + 1 > |T|$, then STOP. Else go to Step 2, wherein said M is a set of demand metrics, wherein said $M^{indep}$ is a subset of demand metrics that are independent, wherein said $M^{dep}$ is a subset of demand metrics that are dependent on other demand metrics, wherein said I is a set of iterations, wherein said $bSlope_{m,m'}$ is a slope parameter of said m with respect to said m', wherein said $bIntercept_m$ is an intercept parameter of said m with respect to all metrics it depends on, wherein said $curVal_m$ is a current or starting value of said m, wherein said $growth_m$ is a growth rate % per time period of said m, wherein said $eventImpact_{e,m,t}$ is a change % of said m due to an event e in said time t, wherein said $B\hat{D}_{mti}$

17 is demand type m generated in said time t in said iteration I, and wherein said $BD_{m,t}$ is a resulting demand of said m in said time t;

translating said information technology application demand into information technology architecture layer demand;

creating resource groups for each information technology application, information technology architecture layer and resource type combination, wherein said resource type is a type of information technology resource used to process said information technology application demand; and computing, by a processor, utilization for each information technology resource group within information technology architecture layers using said created resource groups, said information technology application demand and said information technology architecture layer demand.

2. The method as recited in claim 1 further comprising:
receiving an acceptable utilization limit;
receiving a count and type of resources in each of said resource groups;
receiving an allocation percentage for each information technology resource group within said information technology architecture layers with respect to each information technology application; and
identifying any capacity gaps in said information technology resources using said received acceptable utilization limit, said count and type of resources in each of said resource groups and said allocation percentage for each information technology resource group within said information technology architecture layers with respect to each information technology application.

3. The method as recited in claim 2 further comprising:
computing a resource profile for each resource group in response to capacity gaps being identified in said information technology resources.

4. The method as recited in claim 1 further comprising:
receiving demand metrics for each business component and information technology application.

5. The method as recited in claim 4 further comprising:
estimating current value and growth rate for an independent demand metric out of said received demand metrics for each business component and information technology application.

6. The method as recited in claim 4 further comprising:
estimating an impact of an event on an independent demand metric out of said received demand metrics for each business component and information technology application.

7. The method as recited in claim 4 further comprising:
receiving demand metrics for each dependent demand metrics out of said received demand metrics for each business component and information technology application.

8. The method as recited in claim 7 further comprising:
deriving a relationship between each dependent demand metric with respect to each of its primary demand metric.

9. The method as recited in claim 1 further comprising:
receiving demand metrics for each information technology architecture layer.

10. The method as recited in claim 9 further comprising:
deriving a relationship between said information technology architecture layer demand metric and each corresponding information technology application demand metric.

11. A computer program product embodied in a non-transitory computer readable storage medium for accurately predicting capacity requirements for information technology resources, the computer program product comprising the programming instructions for:

translating business demand into information technology application demand,
wherein said business demand is translated into said information technology application demand using the following algorithm:

Step 1: Initialize $t = -1$, $I = \phi$

Step 2: $t = t + 1$ $i = 0, I = I + \{i\}$ $B\hat{D}_{mti} = curVal_m(1 + growth_m)^t(1 + eventImpact_{emt})$ $\forall \, m \in M^{indep}$ Step 3: $i = i + 1, I = I + \{i\}$ $B\hat{D}_{mti} = \left( \sum_{m' \in M} bSlope_{mm'} B\hat{D}_{m'\,ti-1} \right) + bIntercept_m \forall \, m \in M^{dep}$ If $\sum_{m \in M} B\hat{D}_{mti} = 0$, then go to step 4. Else repeat step 3, Step 4: $BD_{mt} = \sum_{i \in I} B\hat{D}_{mti}$ If $t + 1 > |T|$, then STOP. Else go to Step 2, wherein said M is a set of demand metrics, wherein said $M^{indep}$ is a subset of demand metrics that are independent, wherein said $M^{dep}$ is a subset of demand metrics that are dependent on other demand metrics, wherein said I is a set of iterations, wherein said $bSlope_{m,m'}$ is a slope parameter of said m with respect to said m', wherein said $bIntercept_m$ is an intercept parameter of said m with respect to all metrics it depends on, wherein said $curVal_m$ is a current or starting value of said m, wherein said $growth_m$ is a growth rate % per time period of said m, wherein said $eventImpact_{e,m,t}$ is a change % of said m due to an event e in said time t, wherein said $B\hat{D}_{mti}$ is demand type m generated in said time t in said iteration I, and wherein said $BD_{m,t}$ is a resulting demand of said m in said time t;

translating said information technology application demand into information technology architecture layer demand;

creating resource groups for each information technology application, information technology architecture layer and resource type combination, wherein said resource type is a type of information technology resource used to process said information technology application demand; and computing utilization for each information technology resource group within information technology architecture layers using said created resource groups, said information technology application demand and said information technology architecture layer demand.

12. The computer program product as recited in claim 11 further comprising the programming instructions for:
receiving an acceptable utilization limit;
receiving a count and type of resources in each of said resource groups;
receiving an allocation percentage for each information technology resource group within said information technology architecture layers with respect to each information technology application; and identifying any capacity gaps in said information technology resources using said received acceptable utilization limit, said count and type of resources in each of said resource groups and said allocation percentage for each information technology resource group within said information technology architecture layers with respect to each information technology application.

13. The computer program product as recited in claim 12 further comprising the programming instructions for:

computing a resource profile for each resource group in response to capacity gaps being identified in said information technology resources.

14. The computer program product as recited in claim 11 further comprising the programming instructions for:

receiving demand metrics for each business component and information technology application.

15. The computer program product as recited in claim 14 further comprising the programming instructions for:

estimating current value and growth rate for an independent demand metric out of said received demand metrics for each business component and information technology application.

16. The computer program product as recited in claim 14 further comprising the programming instructions for:

estimating an impact of an event on an independent demand metric out of said received demand metrics for each business component and information technology application.

17. The computer program product as recited in claim 14 further comprising the programming instructions for:

receiving demand metrics for each dependent demand metrics out of said received demand metrics for each business component and information technology application.

18. The computer program product as recited in claim 17 further comprising the programming instructions for:

deriving a relationship between each dependent demand metric with respect to each of its primary demand metric.

19. The computer program product as recited in claim 11 further comprising the programming instructions for:

receiving demand metrics for each information technology architecture layer.

20. The computer program product as recited in claim 19 further comprising the programming instructions for:

deriving a relationship between said information technology architecture layer demand metric and each corresponding information technology application demand metric.

21. A system, comprising:

a memory unit for storing a computer program for accurately predicting capacity requirements for information technology resources; and a processor coupled to said memory unit, wherein said processor, responsive to said computer program, comprises:

circuitry for translating business demand into information technology application demand, wherein said business demand is translated into said information technology application demand using the following algorithm:

Step 1: Initialize $t = -1$, $I = \phi$

Step 2: $t = t + 1$ $i = 0$, $I = I + \{i\}$ $B\hat{D}_{mti} = curVal_m(1 + growth_m)^t(1 + eventImpact_{emt})$ $\forall\, m \in M^{indep}$ Step 3: $i = i + 1$, $I = I + \{i\}$ $B\hat{D}_{mti} = \left(\sum_{m' \in M} bSlope_{mm'} B\hat{D}_{m'ti-1}\right) + bIntercept_m\, \forall\, m \in M^{dep}$ If $\sum_{m \in M} B\hat{D}_{mti} = 0$, then go to step 4. Else repeat step 3, Step 4: $BD_{mt} = \sum_{i \in I} B\hat{D}_{mti}$ If $t + 1 > |T|$, then STOP. Else go to Step 2, wherein said M is a set of demand metrics, wherein said $M^{indep}$ is a subset of demand metrics that are independent, wherein said $M^{dep}$ is a subset of demand metrics that are dependent on other demand metrics, wherein said I is a set of iterations, wherein said $bSlope_{m,m'}$ is a slope parameter of said m with respect to said m', wherein said $bIntercept_m$ is an intercept parameter of said m with respect to all metrics it depends on, wherein said $curVal_m$ is a current or starting value of said m, wherein said $growth_m$ is a growth rate % per time period of said m, wherein said $eventImpact_{e,m,t}$ is a change % of said m due to an event e in said time t, wherein said $B\hat{D}_{mti}$ is demand type m generated in said time t in said iteration I, and wherein said $BD_{m,t}$ is a resulting demand of said m in said time t;

circuitry for translating said information technology application demand into information technology architecture layer demand;

circuitry for creating resource groups for each information technology application, information technology architecture layer and resource type combination, wherein said resource type is a type of information technology resource used to process said information technology application demand; and circuitry for computing utilization for each information technology resource group within information technology architecture layers using said created resource groups, said information technology application demand and said information technology architecture layer demand.

22. The system as recited in claim 21, wherein said processor further comprises:

circuitry for receiving an acceptable utilization limit;

circuitry for receiving a count and type of resources in each of said resource groups;

circuitry for receiving an allocation percentage for each information technology resource group within said information technology architecture layers with respect to each information technology application; and circuitry for identifying any capacity gaps in said information technology resources using said received acceptable utilization limit, said count and type of resources in each of said resource groups and said allocation percentage for each information technology resource group within said information technology architecture layers with respect to each information technology application.

23. The system as recited in claim 22, wherein said processor further comprises:
  circuitry for computing a resource profile for each resource group in response to capacity gaps being identified in said information technology resources.

24. The system as recited in claim 21, wherein said processor further comprises:
  circuitry for receiving demand metrics for each business component and information technology application.

25. The system as recited in claim 24, wherein said processor further comprises:
  circuitry for estimating current value and growth rate for an independent demand metric out of said received demand metrics for each business component and information technology application.

26. The system as recited in claim 24, wherein said processor further comprises:
  circuitry for estimating an impact of an event on an independent demand metric out of said received demand metrics for each business component and information technology application.

27. The system as recited in claim 24, wherein said processor further comprises:
  circuitry for receiving demand metrics for each dependent demand metrics out of said received demand metrics for each business component and information technology application.

28. The system as recited in claim 27, wherein said processor further comprises:
  circuitry for deriving a relationship between each dependent demand metric with respect to each of its primary demand metric.

29. The system as recited in claim 21, wherein said processor further comprises:
  circuitry for receiving demand metrics for each information technology architecture layer.

30. The system as recited in claim 29, wherein said processor further comprises:
  circuitry for deriving a relationship between said information technology architecture layer demand metric and each corresponding information technology application demand metric.

31. A method for accurately predicting capacity requirements for information technology resources, the method comprising:
  forecasting business demand by defining a set of planned or unplanned events and determining their impact on demand;
  determining the relationship between said business demand and information technology demand;
  translating said business demand to said information technology demand at information technology architecture layers,
    wherein said business demand is translated into said information technology demand using the following algorithm:

Step 1: Initialize $t = -1$, $I = \phi$

Step 2: $t = t + 1$
  $i = 0, I = I + \{i\}$
  $B\hat{D}_{mti} = curVal_m(1 + growth_m)^t(1 + eventImpact_{emt})$
  $\forall m \in M^{indep}$ Step 3: $i = i + 1, I = I + \{i\}$
  $B\hat{D}_{mti} = \left( \sum_{m' \in M} bSlope_{mm'} B\hat{D}_{m'\, ti-1} \right) + bIntercept_m \forall m \in M^{dep}$
  If $\sum_{m \in M} B\hat{D}_{mti} = 0$, then go to step 4. Else repeat step 3, Step 4: $BD_{mt} = \sum_{i \in I} B\hat{D}_{mti}$
  If $t + 1 > |T|$, then STOP. Else go to Step 2, wherein said M is a set of demand metrics, wherein said $M^{indep}$ is a subset of demand metrics that are independent, wherein said $M^{dep}$ is a subset of demand metrics that are dependent on other demand metrics, wherein said I is a set of iterations, wherein said $bSlope_{m,m'}$ is a slope parameter of said m with respect to said m', wherein said $bIntercept_m$ is an intercept parameter of said m with respect to all metrics it depends on, wherein said $curVal_m$ is a current or starting value of said m, wherein said $growth_m$ is a growth rate % per time period of said m, wherein said $eventImpact_{e,m,t}$ is a change % of said m due to an event e in said time t, wherein said $B\hat{D}_{mti}$ is demand type m generated in said time t in said iteration I, and wherein said $BD_{m,t}$ is a resulting demand of said m in said time t;
  computing estimated utilization of each of said information technology architecture layers based on said information technology demand and based on an estimate of capacity at said information technology architecture layers;
  identifying any capacity gaps in said information technology resources;
  simulating said capacity gaps;
  generating resolution options to said capacity gaps; and
  selecting, by a processor, a subset of said resolution options to minimize costs.

32. A computer program product embodied in a non-transitory computer readable storage medium for accurately predicting capacity requirements for information technology resources, the computer program product comprising the programming instructions for:
  forecasting business demand by defining a set of planned or unplanned events and determining their impact on demand;
  determining the relationship between said business demand and information technology demand;
  translating said business demand to said information technology demand at information technology architecture layers,
    wherein said business demand is translated into said information technology demand using the following algorithm:

Step 1: Initialize $t = -1$, $I = \phi$

Step 2: $t = t + 1$
  $i = 0, I = I + \{i\}$
  $B\hat{D}_{mti} = curVal_m(1 + growth_m)^t(1 + eventImpact_{emt})$
  $\forall m \in M^{indep}$ -continued Step 3: $i = i+1, I = I + \{i\}$ $$B\hat{D}_{mti} = \left(\sum_{m' \in M} bSlope_{mm'} B\hat{D}_{m'\,ti-1}\right) + bIntercept_m \,\forall\, m \in M^{dep}$$

If $\sum_{m \in M} B\hat{D}_{mti} = 0$, then go to step 4. Else repeat step 3,

Step 4: $BD_{mt} = \sum_{i \in I} B\hat{D}_{mti}$

If $t+1 > |T|$, then STOP. Else go to Step 2, wherein said M is a set of demand metrics, wherein said $M^{indep}$ is a subset of demand metrics that are independent, wherein said $M^{dep}$ is a subset of demand metrics that are dependent on other demand metrics, wherein said I is a set of iterations, wherein said $bSlope_{m,m'}$ is a slope parameter of said m with respect to said m', wherein said $bIntercept_m$ is an intercept parameter of said m with respect to all metrics it depends on, wherein said $curVal_m$ is a current or starting value of said m, wherein said $growth_m$ is a growth rate % per time period of said m, wherein said $eventImpact_{e,m,t}$ is a change % of said m due to an event e in said time t, wherein said $B\hat{D}_{mti}$ is demand type m generated in said time t in said iteration I, and wherein said $BD_{m,t}$ is a resulting demand of said m in said time t;

computing estimated utilization of each of said information technology architecture layers based on said information technology demand and based on an estimate of capacity at said information technology architecture layers;

identifying any capacity gaps in said information technology resources;

simulating said capacity gaps;

generating resolution options to said capacity gaps; and selecting a subset of said resolution options to minimize costs.

33. A system, comprising:
a memory unit for storing a computer program for accurately predicting capacity requirements for information technology resources; and
a processor coupled to said memory unit, wherein said processor, responsive to said computer program, comprises:
  circuitry for forecasting business demand by defining a set of planned or unplanned events and determining their impact on demand;
  circuitry for determining the relationship between said business demand and information technology demand;
  circuitry for translating said business demand to said information technology demand at information technology architecture layers, wherein said business demand is translated into said information technology demand using the following algorithm:

Step 1: Initialize $t = -1$, $I = \phi$

Step 2: $t = t + 1$ $i = 0, I = I + \{i\}$ $B\hat{D}_{mti} = curVal_m (1 + growth_m)^t (1 + eventImpact_{emt})$ $\forall\, m \in M^{indep}$ Step 3: $i = i+1, I = I + \{i\}$ $$B\hat{D}_{mti} = \left(\sum_{m' \in M} bSlope_{mm'} B\hat{D}_{m'\,ti-1}\right) + bIntercept_m \,\forall\, m \in M^{dep}$$

If $\sum_{m \in M} B\hat{D}_{mti} = 0$, then go to step 4. Else repeat step 3,

Step 4: $BD_{mt} = \sum_{i \in I} B\hat{D}_{mti}$

If $t+1 > |T|$, then STOP. Else go to Step 2, wherein said M is a set of demand metrics, wherein said $M^{indep}$ is a subset of demand metrics that are independent, wherein said $M^{dep}$ is a subset of demand metrics that are dependent on other demand metrics, wherein said I is a set of iterations, wherein said $bSlope_{m,m'}$ is a slope parameter of said m with respect to said m', wherein said $bIntercept_m$ is an intercept parameter of said m with respect to all metrics it depends on, wherein said $curVal_m$ is a current or starting value of said m, wherein said $growth_m$ is a growth rate % per time period of said m, wherein said $eventImpact_{e,m,t}$ is a change % of said m due to an event e in said time t, wherein said $B\hat{D}_{mti}$ is demand type m generated in said time t in said iteration I, and wherein said $BD_{m,t}$ is a resulting demand of said m in said time t;

circuitry for computing, by a processor, estimated utilization of each of said information technology architecture layers based on said information technology demand and based on an estimate of capacity at said information technology architecture layers;

circuitry for identifying any capacity gaps in said information technology resources;

circuitry for simulating said capacity gaps;

circuitry for generating resolution options to said capacity gaps; and circuitry for selecting a subset of said resolution options to minimize costs.

\* \* \* \* \*